United States Patent
Knoerle et al.

(10) Patent No.: US 7,688,962 B1
(45) Date of Patent: Mar. 30, 2010

(54) METHOD AND SYSTEM FOR PRESERVING SERVICE NODE RESOURCES AND REDUCING CLIPPING EFFECT

(75) Inventors: Joseph Michael Knoerle, Atlanta, GA (US); Hong Nguyen, Atlanta, GA (US); Zeeman Zhang, Marietta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 0 days.

(21) Appl. No.: 09/383,145

(22) Filed: Aug. 26, 1999

(51) Int. Cl.
*H04M 3/42* (2006.01)
(52) U.S. Cl. .......................... 379/211.04; 379/207.07; 379/207.02
(58) Field of Classification Search ............ 379/207.07, 379/207.02, 207.04, 207.05, 207.16, 211.01
See application file for complete search history.

(56) References Cited

U.S. PATENT DOCUMENTS

| | | | |
|---|---|---|---|
| 5,206,901 A * | 4/1993 | Harlow et al. ........... | 379/211.04 |
| 5,502,762 A | 3/1996 | Andrew et al. ......... | 379/202.01 |
| 5,701,301 A | 12/1997 | Weisser, Jr. ................ | 370/428 |
| 5,802,160 A | 9/1998 | Kugell et al. ............ | 379/211.04 |

* cited by examiner

*Primary Examiner*—Ahmad F. Matar
*Assistant Examiner*—Karen Le
(74) *Attorney, Agent, or Firm*—Christopher W. Glass; Morris Manning & Martin LLP

(57) ABSTRACT

The present invention provides telephone line subscribers the benefits of simultaneous ringing service without wasting telephone network resources. When a simultaneous ringing service subscriber's wireline telephone (the primary telephone) receives an incoming call, a service switching point connected to the primary telephone sends a query to a service control point. The service control point then checks the busy/idle status of the primary telephone as well as the subscriber's wireless telephone (the secondary telephone). If the primary and the secondary telephones are idle and can receive the call, the service control point instructs the service switching point to forward the call to a service node. Otherwise, the service switching point is authorized to terminate the call. When the service node receives the call from the service switching point, it generates two calls simultaneously: one to the primary telephone and one to the secondary telephone. As soon as one of the primary and the secondary telephones is picked up, the service node immediately cancels the call to the telephone that has not answered and connects the caller to the telephone that has answered. The service node then remains on the communication link for several seconds before withdrawing from the communication to minimize a "clipping effect" associated with the use of the service node.

40 Claims, 6 Drawing Sheets

METHOD AND SYSTEM FOR PRESERVING SERVICE NODE RESOURCES AND REDUCING CLIPPING EFFECT

BACKGROUND

1. Field of the Invention

The present invention relates generally to telecommunication systems and more particularly to a method and system for preserving service node resources and reducing clipping effect associated with the provision of an advanced intelligent network service such as a simultaneous ringing service.

2. Background of the Invention

Under the current advanced intelligent network (AIN) structure, a typical telephone call originated by a calling party results in the ringing of the called party's telephone unless the called party subscribes to certain AIN services, such as call forwarding, privacy screening, and messaging, each of which manages an incoming call in a unique manner. AIN structures are described in U.S. Pat. No. 5,701,301, which is hereby incorporated by reference.

A call forwarding service allows a subscriber to answer a call at a telephone different from the telephone for which the call was intended. For example, a telephone customer with a subscription to a call forwarding service can receive a call intended for his home telephone at any location he desires as long as he remembers to activate the call forwarding service by supplying a forwarding telephone number. Typically, a subscriber would designate a telephone at which he would receive all calls intended for his home telephone. Although the call forwarding service allows the subscriber the opportunity to answer the call, such opportunity does not always materialize. For example, if the person answering a forwarded telephone call is not the subscriber, that person might say "wrong number," and the subscriber would be deprived of the opportunity to accept the call.

If the subscriber has a wireless telephone, he could potentially solve the above-identified problem by designating his wireless telephone to receive all forwarded calls from his home wireline telephone. This "solution," however, creates new problems. For example, if the subscriber, having activated the call forwarding service, returns home without deactivating the call forwarding service and having his wireless telephone turned off, he will not be able to receive any calls. Furthermore, even if the subscriber stays home with his wireless telephone turned on, he would be answering a telephone call intended for his wireline telephone using his wireless telephone. In this situation, the subscriber would be paying a higher wireless telephone bill due to the higher rates associated with wireless services. Similarly, the subscriber might be using his wireless telephone unnecessarily when someone at his home could have answered the telephone intended for the home telephone.

Attempts have been made to solve the above problems by providing simultaneous ringing services to multiple telephones of a customer. For example, U.S. Pat. No. 5,206,901 (Harlow) discloses a system for alerting multiple telephones in response to an incoming call to a subscriber's primary telephone. U.S. Pat. No. 5,502,762 (Andrew) discloses a telephone device that, in addition to routing the call to a first telephone, generates additional calls to one or more additional telephones. U.S. Pat. No. 5,802,160 (Kugell) discloses a method in which a telephone service subscriber has greater flexibility in the management of the multiple telephones receiving simultaneous ringing services.

With the exception of Harlow (which does not use a service node), all the above identified prior art patents use up valuable telecommunication resources each time multiple calls are initiated regardless of whether the telephones are busy or idle. For example, three ports are tied up when two simultaneous calls are initiated to telephones that are busy, i.e., unavailable to receive calls. In these prior art inventions, the multiple outgoing calls use up resources even when the subscriber receives no real benefit from the service. For example, when one or more of the call-receiving telephones are busy, in which case a call to the busy telephone or telephones would have been unnecessary, the inventions disclosed in the references would nonetheless initiate calls to these "busy" telephones and thereby use up resources in the telecommunication system. In some cases, the subscriber might also be billed for those unnecessary calls. Furthermore, none of the prior art references identified above helps a subscriber who does not wish to receive calls on any of his secondary telephones when his primary telephones is busy. In summary, none of the references provides a resource-conserving method in which multiple calls are generated only when the primary and the secondary telephones are idle.

Attempts have also been made to use a service node in the advanced intelligent system to place multiple calls simultaneously. One problem associated with using a service node to make simultaneous calls is the so-called "clipping effect" that cuts off the first few seconds of a communication. The clipping effect occurs when the service node withdraws from the circuit after establishing a communication between a calling party and a called party through their service switching points. In addition to being somewhat annoying, the clipping effect could also result in the following negative effects:

(1) The called party does not get an immediate response from the calling party after the called party answers the call. This may cause the called party abandon the call thinking that someone must have dialed a wrong number.

(2) The calling party does not hear anything on her handset for about three seconds after the audible tone stops. This may cause the calling party to abandon the call thinking that the call has been disconnected by the called party.

(3) The called party's answering machine answers the call, and the calling party misses the greeting message. This may cause the calling party to hang up the telephone instead of leaving a message.

There is currently no effective solution for eliminating or reducing the clipping effect caused by call transferring by a service node.

Accordingly, there is a need for a method to conserve service node resources in the provision of AIN services such as simultaneous ringing service. In addition, there is also a need for reducing the clipping effect associated with the provision of AIN services using a service node.

SUMMARY OF THE INVENTION

The present invention provides telephone line subscribers the benefits of an AIN service without wasting telephone network resources. In a preferred embodiment of the present invention that is incorporated into a simultaneous ringing service, wireline and wireless telephone services are integrated so that a call intended for a subscriber's wireline telephone would ring simultaneously in at least two places, e.g., the subscriber's wireline telephone ("the primary telephone") and the subscriber's wireless telephone ("the secondary telephone") as if the wireless telephone is an extension of the subscriber's wireline telephone. The simultaneous ringing service logic program allows more than one secondary telephone to be served by the Simultaneous Ringing service. The secondary telephone may be another wireline telephone or it may be a wireless telephone.

In a preferred embodiment of the present invention, a simultaneous ringing service subscriber of an advanced intelligent network has a primary, wireline telephone connected to a service switching point provisioned with a trigger such as a termination attempt trigger. When the trigger detects an incoming call, it prompts the service switching point to send a query to a service control point that contains a first portion of the simultaneous ringing service logic program. The service control point then checks a database containing the subscriber's primary (e.g., wireline) and secondary (e.g., wireless or other wireline) telephone numbers.

If the simultaneous ringing service has been activated by the subscriber, and a "heartbeat" function indicates that a service node containing a second portion of the simultaneous ringing service logic program is operational, the service control point performs two tasks simultaneously. First, the service control point sends an AIN message to the service switching point to check the busy/idle status of the primary telephone. In addition, if one or more secondary telephones are wireline telephones, then the corresponding service switching points of these secondary, wireline telephones also receive AIN messages from the service control point that checks the busy/idle status of the secondary telephones. Second, the service control point also sends a different AIN message to a home location register that serves the secondary, wireless telephone. In a preferred embodiment, the AIN message is an IS-41 message. If one of the primary and secondary telephones is busy, the service control point authorizes the service switching point to complete the call to the primary telephone only. In this case, no network resources are wasted because only one call is generated.

In a preferred embodiment in which the secondary telephone is a wireless telephone, if the service switching point returns an AIN message indicating that the primary telephone is idle, i.e., available to receive call, and the home location register also returns a message indicating that the secondary telephone is also idle, the service control point sends an instruction to the service switching point to forward the call to the service node. In the preferred embodiment, the service node dials the secondary telephone several seconds prior to ringing the wireline telephone to accommodate the delay associated with wireless telephone networks. Note that the present invention only uses network resources when both the primary and the secondary telephones are idle. Network resources are therefore preserved in other situations.

As soon as one of the primary and the secondary telephones is picked up, the service node immediately cancels the call to the telephone that has not answered the call and connects the caller to the telephone that has answered the call. For example, if the secondary telephone is picked up first, the service cancels the call to the primary telephone, and the caller is connected to the secondary telephone. On the other hand, if the primary telephone is picked up first, the call to the secondary telephone is canceled and communication between the caller and the primary telephone is established. In the rare occasion in which one or both of the primary and secondary telephones become busy after the service node has generated the calls to them, the service node preferably cancels both calls (because otherwise the caller or the subscriber would be billed for a service from which he or she received no benefit). In that case, the calling party's service switching point continues to ring even though the service node has cancelled the calls. Alternatively the service node plays a busy tone, in which case the calling party could be charged for the call.

Once the service node has successfully connected the calling party to one of the caller's telephones, the service node remains on the communication for several seconds before withdrawing from the call. This delay of service node withdrawal results in the clipping effect occurring not at the beginning of the communication, but at a later time after either the called party's answering machine has substantially completed its greeting, or the calling party and the called party have identified themselves to each other.

Accordingly, it is an object of the present invention to allow telephone subscribers greater flexibility in managing incoming calls.

It is another object of the present invention to allow subscribers to answer telephone calls using either a primary telephone or one or more secondary telephones all of which ring simultaneously when the subscriber's primary telephone number is dialed by a calling party.

It is yet another object of the present invention to preserve service node resources by making multiple calls only when the multiple telephones are available to receive calls.

It is still another object of the present invention to avoid charges to callers who do not benefit from the service.

It is still another object of the present invention to provide a "true simultaneous" ringing service by timing the call to the secondary and primary telephones so that the two telephones ring at the same time.

It is still another object of the present invention to provide a distinctive ring to simultaneous ringing service subscribers.

It is still another object of the present invention to minimize the clipping effect associated with the use of a service node.

DETAILED DESCRIPTION OF THE INVENTION

The present invention can be used for any AIN services that use a service node. The following description relates specifically to the application of the present invention to a simultaneous ringing service. However, the present invention could also be used for any other AIN services that utilize a service node to place a call including, for example, call forwarding services.

Figure 1:
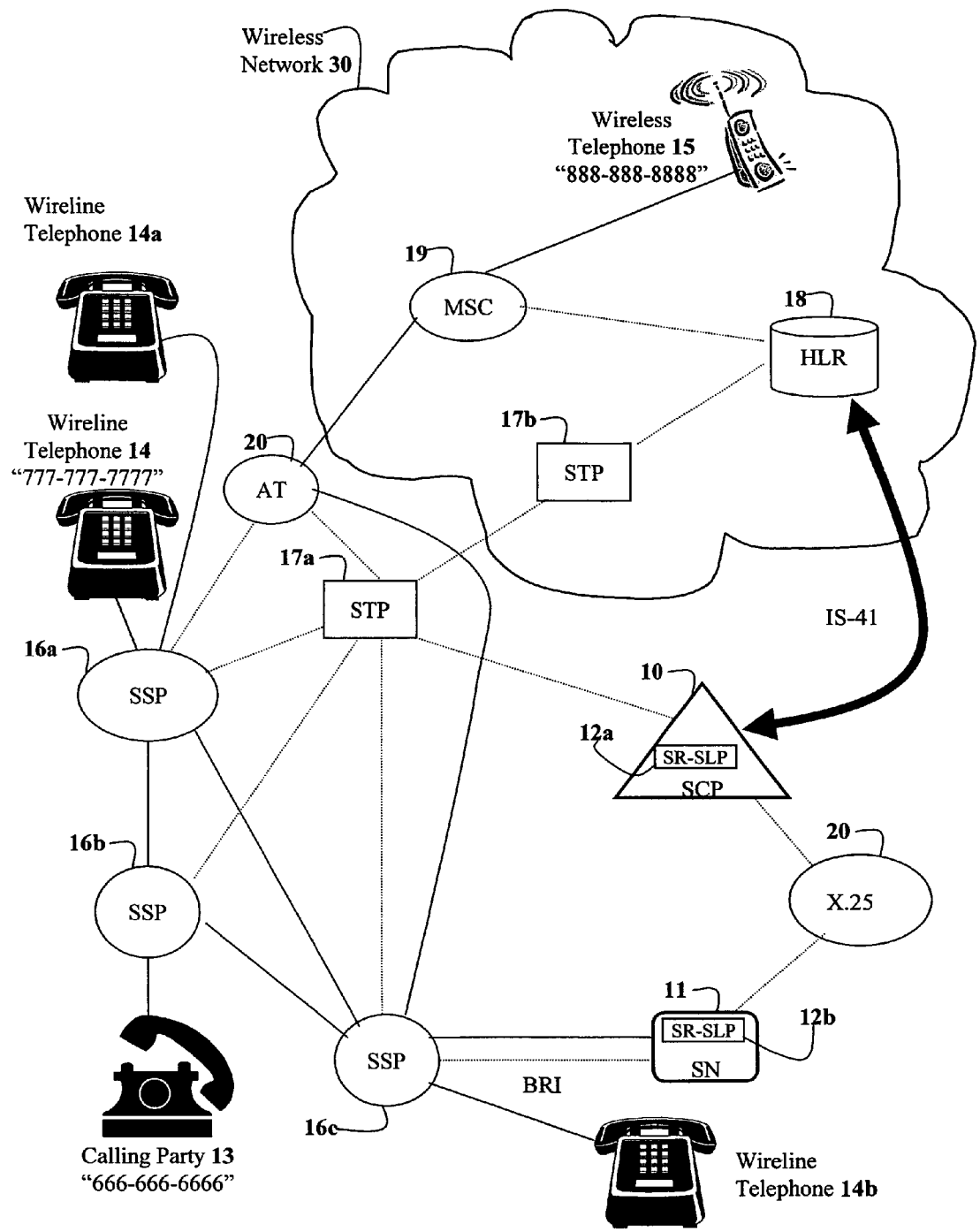
FIG. 1 is a schematic diagram illustrating a high level view of the network architecture used to implement preferred embodiments of the present invention.

FIG. 1 is a schematic diagram illustrating a high level view of the architecture of a preferred embodiment of the present invention. The Simultaneous Ringing service logic program (SR-SLP) of the present invention includes two parts: The service control point part SR-SLP 12a is installed on service control point (SCP) 10, and the service node part SR-SLP 12b is installed on service node (SN) 11. These two parts of the Simultaneous Ringing service logic program of the present invention communicate with each other through the exchange of messages via X.25 interface 20. These messages provide the "heartbeat function." SR-SLP 12a and SR-SLP 12b provide complementary functions needed to implement the present invention.

Generally, SR-SLP 12a is responsible for accepting queries, e.g., Termination_Attempt queries from the service switching point 16a that is connected to the primary telephone of a subscriber. SR-SLP 12a is also responsible for checking the busy/idle status of the subscriber's primary and secondary telephones. If all the subscriber's telephones are idle, SR-SLP 12a prompts service control point 10 to instruct service switching point 16a to forward the call to service node 11. Then, SR-SLP 12b, residing at service node 11, dials the multiple telephone numbers of the subscriber, and connects the calling party to the first telephone of the subscriber that answers. SR-SLP 12b is also responsible for accepting activation instructions from the subscriber and then updating service control point 10 as to the status of the primary and secondary telephones.

Consider an example in which a subscriber's primary telephone is a wireline telephone 14 and his secondary telephone is a wireless telephone 15. When a caller, e.g., calling party 13, dials the telephone number of the primary, wireline telephone 14, a trigger provisioned at service switching point (SSP) 16a launches a query to service control point 10 via signal transfer point (STP) 17a of the signal system 7 (SS7) employed by the advanced intelligent network. In a preferred embodiment, the trigger is a termination attempt trigger. Upon receiving the query, SR-SLP 12a on service control point 10 checks the activation status of the subscriber's Simultaneous Ringing service and the operational status of service node 11. In a preferred embodiment, service control point 10 and service node 11 communicate with each other through the exchange of messages via X.25 interface 20.

If either the Simultaneous Ringing service has not been activated or service node 11 is not operational, SR-SLP 12a prompts service control point 10 to instruct service switching point 16a to terminate the call, i.e., to route the call to wireline telephone 14, and no network resources would be wasted because no simultaneous calls had been initiated. In a preferred embodiment in which the subscriber has a distinctive ringing service, e.g., RingMaster service provided by BellSouth, service control point 10 instructs service switching point 16a to deliver the call to an alternate telephone such as wireline telephone 14a.

On the other hand, if the subscriber's Simultaneous Ringing service has been activated and service node 11 is operational, SR-SLP 12a prompts service control point 10 to perform two tasks immediately. First, service control point 10 sends a Monitor_for_Change message to service switching point 16a to ask service switching point 16a to monitor for a change in the status of wireline telephone 14. Second, service control point 10 sends a LocationRequest message to home location register (HLR) 18 via the IS-41 system of a wireless intelligent network 30 to check the status of the subscriber's wireless telephone 15. Home location register 18 obtains the status of wireless telephone 15 through mobile switching center (MSC) 19. If wireline telephone 14b is a secondary telephone for the subscriber, service control point 10 also sends a Monitor_for_Change message to service switching point 16c to determine the busy/idle status of wireline telephone 14b.

In response, service switching point 16a returns a Status_Reported response to service control point 10 reporting the status of wireline telephone 14, and home location register 18 returns a LocationRequest Return Result response to service control point 10 reporting the status of wireless telephone 15. If wireline telephone 14 is busy, i.e., someone is using the telephone, SR-SLP 12a prompts service control point 10 to authorize call termination to wireline telephone 14, and service switching point 16b plays a busy signal for calling party 13. When the subscriber's wireline telephone 14 is busy, the status of the subscriber's wireless telephone 15 is irrelevant because the purpose of the Simultaneous Ringing service is to ring both wireless telephone 15 and wireline telephone 14 only when both wireline telephone 14 and wireless telephone 15 are idle. The Simultaneous Ringing service of the present invention is not intended to call a secondary telephone when the primary telephone is busy. This "screening" step avoids the use of valuable telecommunication resources, e.g., calling wireless telephone 15 unnecessarily.

If wireline telephone 14 is idle, and the LocationRequest Return response received from home location register 18 indicates that wireless telephone 15 is also available to receive calls, service control point 10 sends an instruction to service switching point 16a to forward the call to service node 11. In a preferred embodiment, service node 11 uses a trigger, e.g., a Customer Dialing Plan Access Code trigger, to preserve calling party 13's caller identification number.

Once the call from calling party 13 is forwarded to service node 11, the service node portion of the Simultaneous Ringing service logic program SR-SLP 12b takes over by prompting service node 11 to make two outgoing calls simultaneously: one to wireless telephone 15 and another to wireline telephone 14. Note that the present invention uses resources to make multiple calls only when all the primary and secondary telephones are determined to be available to receive calls. In a preferred embodiment when the secondary telephone is a wireless telephone service, node 11 calls wireless telephone 15 about four seconds before calling wireline telephone 14 to accommodate the delay associated with wireless services. As soon as one of wireline telephone 14 and wireless telephone 15 answers, service node 11 cancels the call to the non-responding telephone and connects the call to the telephone that has answered. For example, if wireless telephone 15 is picked up first, service node 11 cancels the call to wireline telephone 14, connects the call to wireless telephone 15, and withdraws from the communication link. A communication between calling party 13 and wireless telephone 15 is then established, e.g., via service switching points 16b, 16a, 16c, and mobile switching center 19. On the other hand, if wireline telephone 14 is picked up first, the communication link between calling party 13 and wireline telephone 14 after service node 11 has withdrawn would be, e.g., via service switching point 16b and service switching point 16a. The withdrawal of service node 11 after the establishment of the communication allows service node 11 to free up the resources.

In a preferred embodiment, service node 11 does not withdraw immediately to make sure that any consequences of the clipping effect are reduced. The clipping effect, which typically lasts two to three seconds, causes a silent period during which neither the calling party nor the called party can hear each other. By staying on the line for a predetermined amount of time, e.g., 30 seconds, before withdrawing, service node 11 reduces the consequences of the clipping effect by shifting it from the beginning of the communication to a later time. This delay is significant because the first few seconds of a telephone communication is the most critical period. For example, the clipping effect, if not delayed, could well cause the calling party to miss the called party's greeting, so that the calling party might not even know whether she has dialed the correct telephone number.

In a preferred embodiment, if neither wireline telephone 14 nor wireless telephone 15 is picked up within a predetermined duration, service node 11 would cancel both calls by the use of a timer. Preferably, service node 11 could also cancel both calls in the unlikely situation in which both wireline telephone 14 and wireless telephone 15 subsequently become unavailable after service switching point 16a has forwarded the call to service node 11. In that case, calling party 13 would not be charged for the unsuccessful attempt to reach the subscriber. This feature prevents unnecessary billing for unsuccessful simultaneous ringing attempts.

The present invention also allows the subscriber to have more than one secondary telephone. If one of the secondary telephones is a wireline telephone, then the busy/idle status of that wireline telephone is determined the same way the primary telephone's busy/idle status is checked, i.e., by the exchange of Monitor_for_Change messages and Status_Reported responses.

Figure 2A:
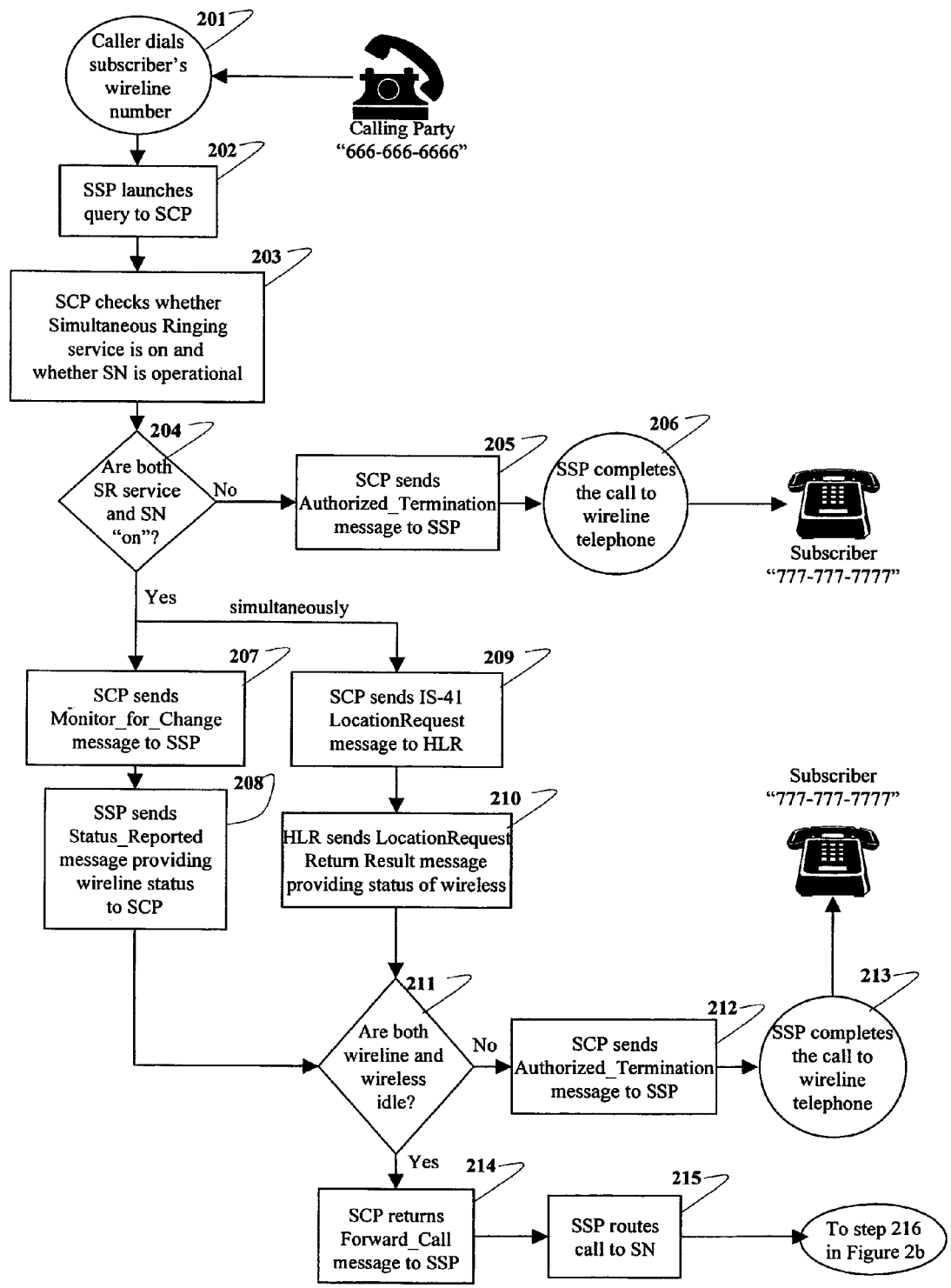
FIGS. 2a and 2b collectively represent a flowchart illustrating the processing steps used to execute a preferred embodiment of the present invention.
Figure 2B:
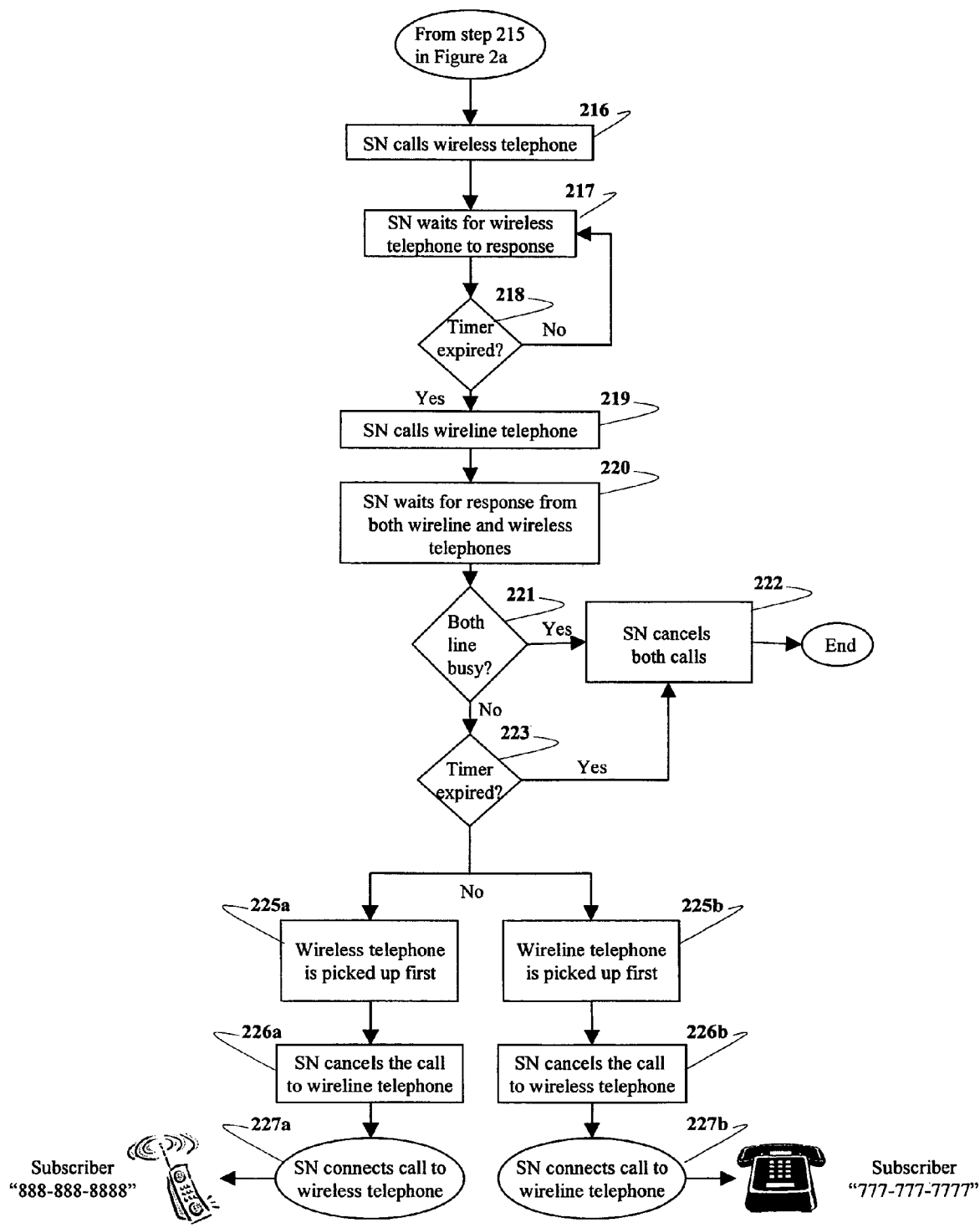

FIGS. 2a and 2b collectively represent a flowchart illustrating the processing steps involved in a preferred embodiment of the present invention in which the primary and secondary telephones are wireline and wireless telephones, respectively. In step 201, a calling party picks up a telephone and dials the telephone number of a Simultaneous Ringing (SR) service subscriber's primary telephone. In step 202, this call causes a trigger, e.g., a termination attempt trigger, provisioned at a service switching point (SSP) connected to the subscriber's primary telephone to launch a query to a service control point (SCP) on which the service control point portion of the Simultaneous Ringing service logic program of the present invention is residing. For example, if the calling party's telephone number is "666-666-6666" and the subscriber's wireline telephone number is "777-777-7777," then the query would contain CallingPartyID="666-666-6666," and CalledPartyID="777-777-7777."

When the service control point receives the query in step 203, it consults a database and recognizes "777-777-7777" as the primary telephone number of a Simultaneous Ringing service subscriber. The service control point first checks whether the subscriber has activated the Simultaneous Ringing service. The service control point then checks whether a service node (SN) containing the service node portion of the Simultaneous Ringing service logic program is operational. In a preferred embodiment, a "heartbeat" function is maintained between the service control point and the service node by the exchange of regular messages via X.25 interface.

In step 204, if either the service node is not operational or the Simultaneous Ringing service has not been activated by the subscriber, the service control point sends an Authorize_Termination message in step 205 to the service switching point from which the query had originated. The Authorize_Termination message is an instruction from the service control point to allow the service switching point to terminate the call, i.e., to put the call through. In step 206, the service switching point completes the call to the subscriber's wireline telephone the same way a call is routed without the Simultaneous Ringing service. Because the telecommunication system has not made more than one call, use of network resources has been minimized.

If in step 204 the service node is operational and the Simultaneous Ringing service has been activated by the subscriber, the service control point sends a Monitor_for_Change message to the service switching point in step 207 to find out whether the wireline telephone is available to receive the call. Since the service control point maintains a database containing both the primary and secondary telephone numbers, the service control point also simultaneously sends an IS-41 LocationRequest message to a home location register (HLR) of the subscriber's wireless service provider to determine whether the subscriber's wireless telephone is available to receive the call. In step 208, the service switching point sends a Status_Reported message to the service control point providing the status of the wireline telephone. Similarly, in step 210 the home location register sends a LocationRequest Return Result message to the service control point providing the status of the wireless telephone.

In step 211, the service control point receives the Status_Reported response from the service switching point and the LocationRequest Return Result response from the home location register. If either the wireline telephone or the wireless telephone is unavailable (for example, the wireline telephone is being used, the wireless telephone is turned off, the wireless telephone is being used, or the wireless telephone is out of the range of its service area), the service control point proceeds to step 212 to send an Authorize_Termination message to the service switching point. Then in step 213, the service switching point completes the call to the wireline telephone. If the wireline telephone is busy, the service switching point would play a busy tone for the caller. If the wireless telephone is unavailable, the service switching point completes the call to the wireline telephone and the caller hears a ringing tone. Again basic rate resources are minimized, because the telecommunication system has not generated more than one call and therefore has not used up more resources than necessary.

If in step 211 both the wireline telephone and the wireless telephone are idle, the service control point proceeds to step 214. The service control point sends a Forward Call message to the service switching point. This message contains the service node telephone number in the CalledPartyID field. Then in step 215 the service switching point routes the call to the service node.

The service node calls the wireless telephone and the wireline telephone simultaneously. In a preferred embodiment, the service node places the two outgoing calls by using the Customer Dialing Plan Access Code trigger ("CDP AC trigger") to preserve the caller's identification number ("CallingPartyID"). The CDP AC trigger is assigned an access code, e.g., "101," with the service node customized dialing plan. The CDP AC trigger is invoked when the service node makes a call by dialing an access code, e.g., "101," followed by the CallingPartyID (the calling Party's telephone number) and the CalledPartyID (subscriber's wireline telephone number or wireless telephone number). The use of the CDP AC trigger allows the service control point to provide the CallingPartyID to be displayed to the subscriber. The service node provides the CallingPartyID if it is "available." If the service node receives the indication that the CallingPartyID is "private," the service node will encode the 10-digit CallingPartyID as "111-111-1111" to mark it as "private." If the service node receives the indication that the CallingPartyID is "unavailable," the service node will encode the 10-digit CallingPartyID with "222-222-2222" to mark it as "unavailable." If the calling party with telephone number of "666-666-6666" does not have a private telephone number, then the service node dials "101-666-666-6666," and the CallingPartyID is preserved. In all cases, the CalledPartyID would be "777-777-7777."

In a preferred embodiment shown in FIG. 2b, however, the service node calls the wireless telephone first (step 216) and waits for about four seconds before calling the wireline telephone to accommodate the delay associated with wireless telephone communication. This waiting function is shown in steps 217 and 218 by using a timer. This timer is a tunable variable that is used to fine tune the simultaneous ringing of the wireline and wireless telephones. Once the timer expires in step 218, the service node proceeds to step 219 to call the wireline telephone. As shown in step 220, the service node waits for the wireless telephone and the wireline telephone to respond. In step 221, if both the wireline and the wireless telephones become busy during the interim, the service node cancels both calls in step 222 to conserve network resources.

If both wireline and wireless telephones remain idle before the timer in step 223 expires, the service switching point that is connected to the service node, e.g., SSP 16c in FIG. 1, detects the call from the service node and sends the Info Analyzed query to the service control point with Access-Code="101", and CollectedDigits="777-777-7777." For the call to the subscriber's wireline telephone, the service control point returns an Analyze_Route message with CalledPartyID="777-777-7777", CallingPartyID="666-666-6666", and RedirectingPartyID="404-123-4567" (assuming "404-123-4567" to be the number of the service node).

For the call to the subscriber's wireless telephone, the service control point returns an Analyze_Route message with CalledPartyID="888-888-8888", and CallingPartyID="666-666-6666." The call to the wireless telephone number is routed to the wireless telephone. The call to the subscriber's wireline number is routed and re-encounters the termination attempt trigger. As a result, the service switch point (e.g., SSP 16a in FIG. 1) sends a Termination_Attempt query to the service control point with CalledPartyID="777-777-7777"; CallingPartyID="666-666-6666", and OriginatingCalledPartyID="404-123-4567."

When the service control point receives the Termination_Attempt query from the service switching point, it recognizes the service node number in the OriginatingCalledPartyID and returns an Authorize_Termination message to the service switching point.

If either the wireless telephone or the wireline telephone is picked up before the timer in step 223 expires, then two mutually exclusive alternatives exist. First, if the call to the wireless telephone is answered first in step 225a (in FIG. 2b), the service node cancels the call to the wireline telephone in step 226a and connects the call to the wireless telephone in step 227a. Alternatively, if the call to the wireline telephone is answered first in step 225b, the service node cancels the call to the wireless telephone in step 226b and connects the call to the wireline telephone in step 227b. The present invention also allows the simultaneous ringing service to be provided to one or more secondary telephones that are wireline based.

Figure 3:
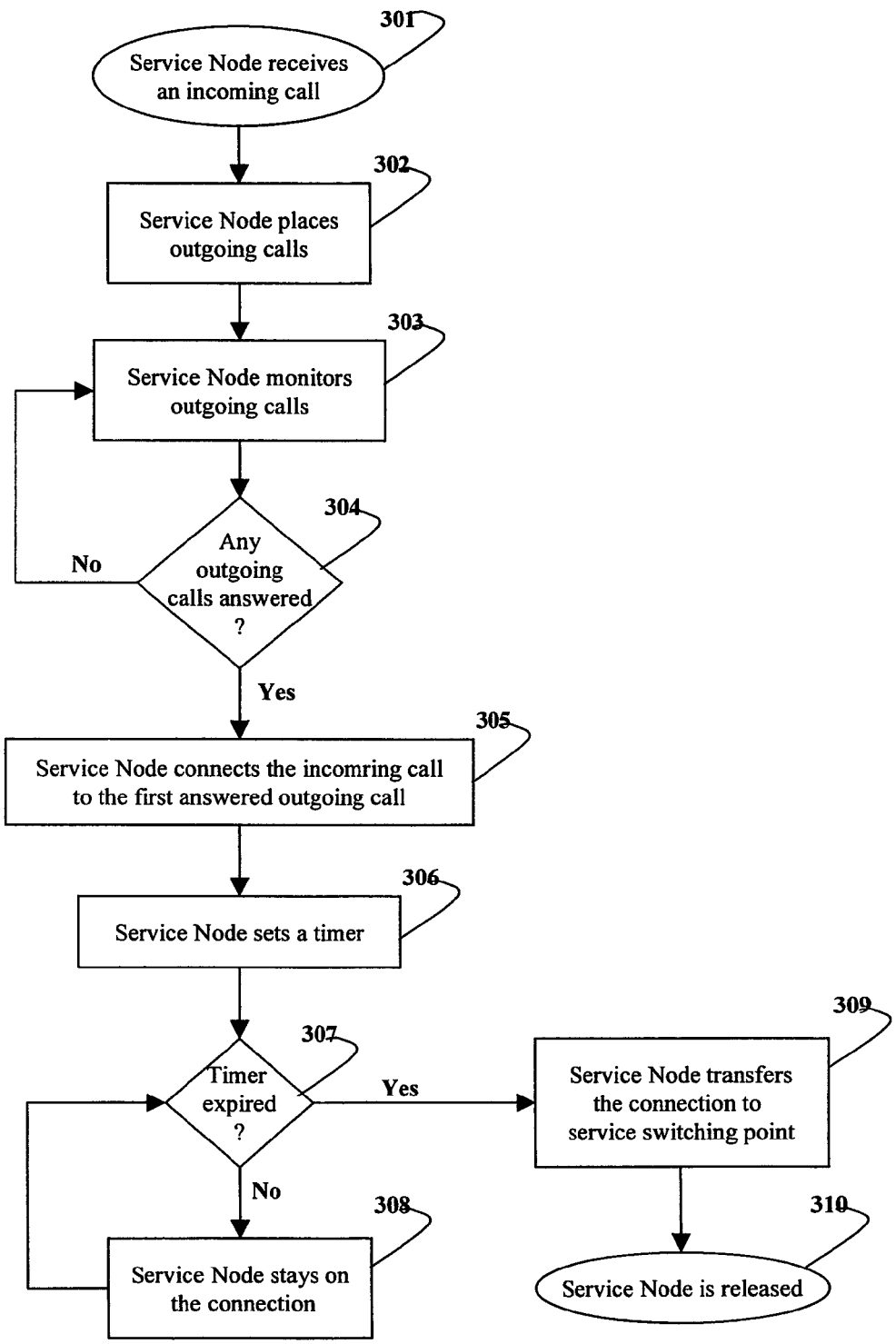
FIG. 3 represents a flowchart illustrating the processing steps used to minimize the clipping effect associated with the use of a service node.

FIG. 3 represents a flowchart illustrating the processing steps used to minimize the clipping effect associated with the use of a service node. In step 301, the service node receives an incoming call containing an instruction to place One or more outgoing calls. In step 302, the service node places the outgoing calls. The service node then monitors the outgoing calls in step 303. In step 304, if none of the outgoing calls is answered, the process returns to step 303 where the service node continues to monitor the outgoing calls. As soon as one of the outgoing calls is answered in step 304, the service node proceeds to step 305 to connect the incoming call to the answered outgoing call. In step 306, the service node remains on the communication link for a predetermined duration set by a timer. In a preferred embodiment, the duration is a tunable variable. The service node continues to hold the connection in step 308 as long as the timer has not expired in step 307. The process proceeds to step 309 once the time expires in step 307. The service node then withdraws from the communication link in step 310.

Figure 4A:
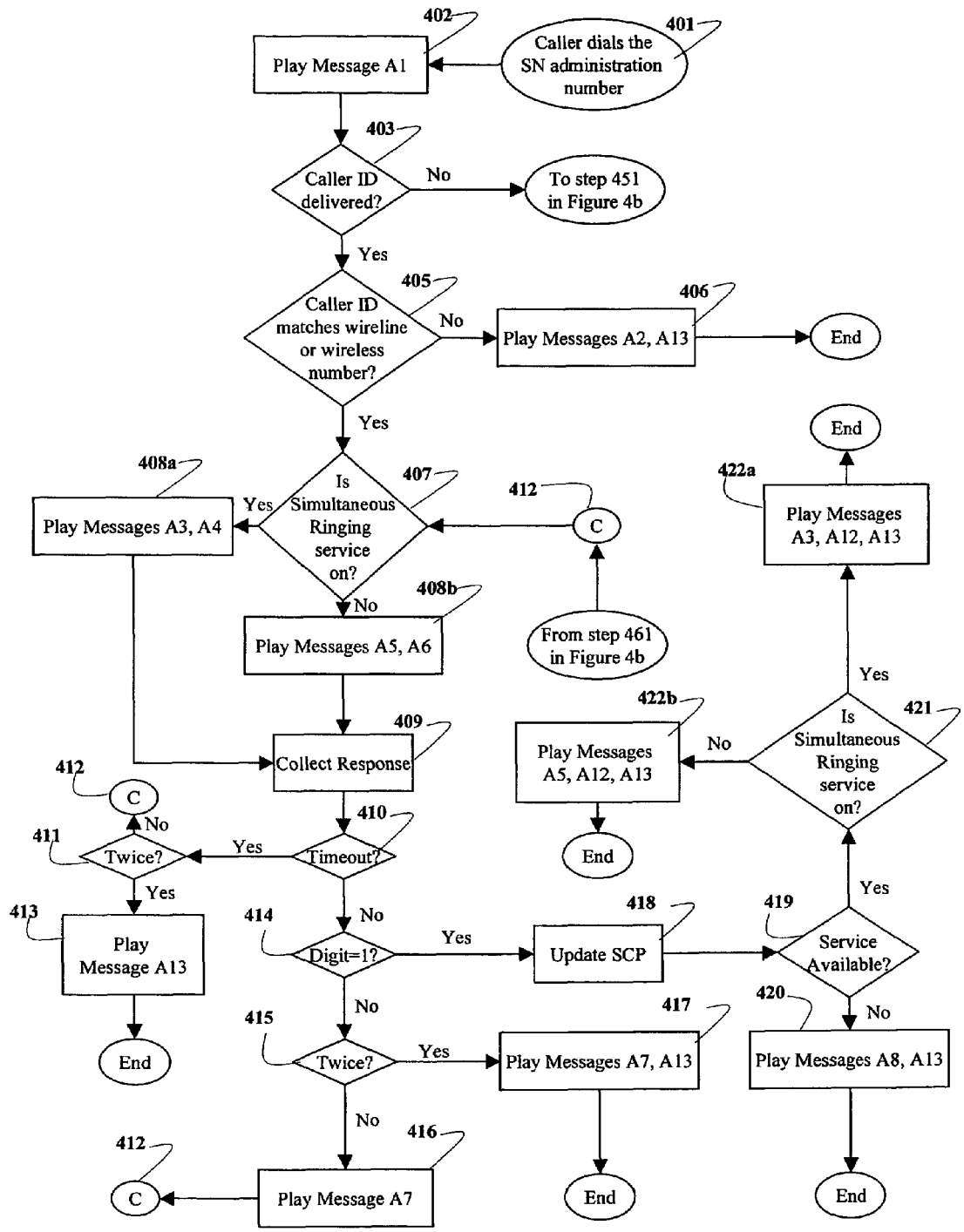
FIGS. 4a and 4b collectively represent a flowchart showing a preferred embodiment of how a subscriber may change the activation status of the Simultaneous Ringing service.
Figure 4B:
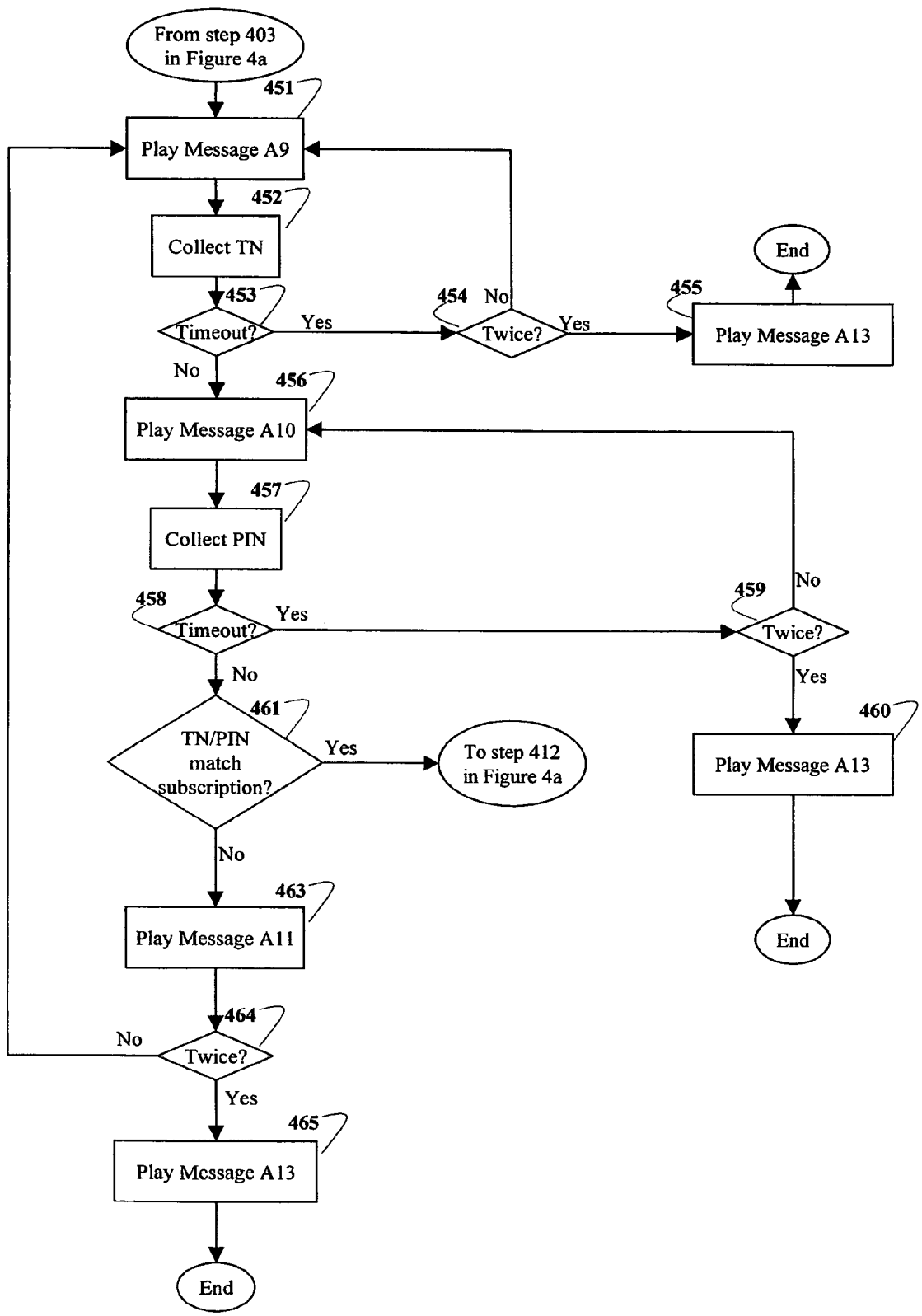

FIGS. 4a and 4b collectively represent a flowchart showing an example of how a subscriber may change the activation status of the Simultaneous Ringing service. In this example, the telephone that is utilized to activate or deactivate the Simultaneous Ringing service must be either the subscriber's wireline telephone 14 or the subscriber's wireless telephone 15 that have been "registered" with the telephone company. In a preferred embodiment, the telephone numbers of the wireline telephone 14 and the wireless telephone 15 are stored in service logic program 12b residing on service node 11 shown in FIG. 1.

In step 401 shown in FIG. 4a, the subscriber dials the service node (SN) administration number, and the service switching point to which the subscriber's telephone is connected routes the call to the service node. When the communication is established, the service node in step 402 plays message A1, e.g., "Welcome to Simultaneous Ringing service." In step 403, if the query contains a caller identification number (CallingPartyID), the service node makes a further determination in step 405 of whether the caller identification number matches the subscriber's wireline or wireless telephone numbers that are in a database. If the query does not contain a caller identification number, then the process continues in step 451 in FIG. 4b.

In step 451 (shown in FIG. 4b), the service node plays message A9, e.g., "Please enter your 10-digit home or wireless telephone number." The service node then collects the 10-digit telephone number (TN) in step 452. In a preferred embodiment, a timer is set in step 453. If the caller does not supply the requested information, the service node allows the caller a second chance in step 454 and returns to step 451. If the caller failed to supply the requested information for the second time, in step 455 the service node plays message A13, e.g., "Good Bye," and ends the call. If in step 453 the caller supplies a ten digit number before the timer expires, the service node requests the caller's personal identification number (PIN) by playing in step 456 message A10, e.g., "Please enter your PIN. When you have finished, press the pound key." The service node then collects the personal identification number in step 457. Again, steps 458 and 459 provide the caller two chances to supply the personal identification number before another time expires. If the caller fails to supply the requested information for the second time, in step 460 the service node plays message A13, e.g., "Good Bye."

In step 461, if the telephone number and the personal identification number do not match those contained in the database, the service node plays message A11, e.g., "The PIN and the telephone number you have entered do not match," in step 463 and gives the caller a second chance to enter them correctly by returning to step 451. Two unsuccessful attempts by the caller to correctly match the telephone number and the personal identification number end the communication in step 465. If the telephone number and the personal identification number do match in step 461, the service node proceeds to step 412 (connector "C" shown in FIG. 4a).

If in step 403 (shown in FIG. 4a) the query contains a caller identification number ("CallingPartyID"), the service node proceeds to step 405 to determine whether the caller identification number is recognized by the service node as one of the registered telephone numbers. If the caller identification number contained in the query is not recognized as a valid telephone number, i.e., the wireline or wireless telephone number, of a Simultaneous Ringing service subscriber, the service node plays, in step 406, message A2, e.g., "Your Simultaneous Ringing service can only be turned on and off from either your home telephone or your wireless telephone," and then message A13, e.g., "Good Bye." The call is then disconnected.

On the other hand, if the caller identification number supplied is recognized, or if the caller had successfully matched a telephone number with a personal identification number in step 461 previously discussed (shown in FIG. 4*b*), the service node proceeds to step 407 to check the existing activation status of the subscriber's Simultaneous Ringing service. If the current status of the Simultaneous Ringing service is "on," the service node plays, in step 408*a*, a message A3, e.g., "Your Simultaneous Ringing service is on," followed by a message A4, e.g., "To turn your service off, please press 1. To exit the system without making changes, simply hang up." On the other hand, if the current status of the Simultaneous Ringing service is "off," the service node plays another set of messages in step 408*b*, including message A5, e.g., "Your Simultaneous Ringing service is off," followed by message A6, e.g., "To turn your service on, please press 1. To exit the system without making changes, simply hang up."

In step 409, the service node collects the response from the caller. Another timer is set in step 410, and the caller is given two-chances in steps 411 and 412 to respond before the service node ends the call in step 413. In step 414, the service node determines whether the response is "1" as requested. If it is not, the caller is given a second chance in step 415 and the service node plays message A7, e.g., "That is not a valid selection," in step 416 and returns to step 412. Two unsuccessful attempts to respond would end the call in step 417. If the response is "1" in step 414, the service node sends a message via the X.25 interface, in step 418 to the service control point (SCP) that hosts the Simultaneous Ringing service logic program with the destination_network_id=SCP CLLI code, Routing key=(SSN, residential number) and data=status (on/off), and waits for an acknowledgment from the service control point via the X.25 interface.

If the service control point cannot be successfully updated in step 419, the service node plays, in step 420, message A8, e.g., "The service is temporarily unavailable. Please try your call again later," followed by message A13, e.g., "Good Bye." However, if an acknowledgment is received from the service control point indicating the service is available in step 419, the service node proceeds to step 421. There, two mutually exclusive sets of messages are available. If the caller had activated the Simultaneous Ringing service, the service node in step 422*a*, plays messages A3, A12, and A13, e.g., "Your Simultaneous Ringing Service is on. Thank you for using Simultaneous Ringing service. Good Bye." If the caller had deactivated the Simultaneous Ringing service, the service node plays, in step 422*b*, messages A5, A12, and A13, e.g., "Your Simultaneous Ringing Service is off. Thank you for using Simultaneous Ringing service. Good Bye." Table 1 below summarizes messages A1 through A13 that are used as examples.

TABLE 1

Examples of Messages for FIGS. 4a and 4b

| Message | Example |
|---|---|
| A1 | Welcome to Simultaneous Ringing service. |
| A2 | Your Simultaneous Ringing service can only be turned on and off from either your home telephone or your wireless telephone. |
| A3 | Your Simultaneous Ringing service is on. |
| A4 | To turn your service off, please press 1. To exit the system without making changes, simply hang up. |
| A5 | Your Simultaneous Ringing service is off. |
| A6 | To turn your service on, please press 1. To exit the system without making changes, simply hang up. |
| A7 | That is not a valid selection. |
| A8 | The service is temporarily unavailable. Please try your call again later. |
| A9 | Please enter your 10-digit home or wireless telephone number. |
| A10 | Please enter your PIN. When you have finished, press the pound key. |
| A11 | The PIN and the telephone number you have entered do not match. |
| A12 | Thank you for using Simultaneous Ringing service. |
| A13 | Good Bye. |

The foregoing disclosure of embodiments of the present invention and specific examples illustrating the present invention have been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What we claim is:

1. A method for making simultaneous ringing calls comprising:
   detecting an incoming call to a first telephone by a service switching point;
   determining by a service control point associated with the service switching point an operational status of a service node;
   checking by the service control point a busy/idle status of a second telephone associated with the first telephone if the service node is operational; and
   generating a first outgoing call to the first telephone and a second outgoing call to the second telephone by the service node if, but only if, the first telephone and second telephone are idle.

2. The method of claim 1, wherein the detecting is performed by a trigger provisioned at the service switching point.

3. The method of claim 2, wherein the trigger is a termination attempt trigger.

4. The method of claim 1, wherein the checking is performed by the service control point by sending a Monitor_for_Change message to, and by receiving a Status_Reported message from, the service switching point.

5. The method of claim 1, further comprising exchanging messages between the service control point and the service node via X.25 interface.

6. The method of claim 1, wherein the second telephone is a wireless telephone that is served by a home location register.

7. The method of claim 6, wherein the checking is performed by the service control point by sending an IS-41 LocationRequest message to, and by receiving an IS-41 LocationRequest Return Result message from, the home location register.

8. The method of claim 1, further comprising checking a busy/idle status of the first telephone if the service node is operational.

9. The method of claim 8, wherein the first outgoing call and the second outgoing call are generated if both the first telephone and the second telephones are idle.

10. A method for providing simultaneous ringing service comprising:
    associating telephone numbers of a primary telephone and a secondary telephone in a database;
    detecting an incoming call to the primary telephone;
    determining an operational status of a service node;

checking busy/idle status of the primary telephone and the secondary telephone if the service node is operational;

generating by the service node a first outgoing call to the primary telephone and a second outgoing call to the secondary telephone if, but only if, both the primary telephone and the secondary telephone are idle; and upon answering by the primary telephone or the secondary telephone, connecting the incoming call to the telephone that has answered and canceling the call to the other telephone that has not answered.

11. The method of claim 10, wherein the database is maintained at a service control point, and wherein the detecting is performed by a trigger provisioned at a first service switching point associated with the primary telephone.

12. The method of claim 11, wherein the secondary telephone is a wireline telephone that is connected to a second service switching point.

13. The method of claim 12, wherein the checking is performed by the service control point by sending Monitor_for_Change messages to, and by receiving Status_Reported messages from, the first service switching point and the second service switching point.

14. The method of claim 11, wherein said the secondary telephone is a wireless telephone line that is served by a home location register.

15. The method of claim 14, wherein the checking is performed by the service control point sending a Monitor_for_Change message to, and receiving a Status_Reported message from, the first service switching point, and sending an IS-41 LocationRequest message to, and receiving an IS-41 LocationRequest Return Result message from, the home location register.

16. The method of claim 15, wherein the first outgoing call is generated about four seconds after the second outgoing call is generated.

17. The method of claim 10, further comprising:
keeping the incoming call connected through the service node for a predetermined duration; and
upon expiration of the predetermined duration, withdrawing the service node from the incoming call connection.

18. The method of claim 17, wherein the predetermined duration is a tunable variable.

19. An advanced intelligent network telecommunication system comprising:
a first service switching point connected to a primary telephone of a subscriber, the primary telephone having a primary telephone number;
a service control point having a database associating the primary telephone number with a secondary telephone number of a secondary telephone of the subscriber;
means for detecting an incoming call to the primary telephone;
means for determining an operational status of a service node associated with the service control point; and
means for checking busy/idle status of the primary telephone and secondary telephone,
wherein when the incoming call to the primary telephone is detected, the service control point determines the operational status of the service node, and the service control point checks the busy/idle status of the primary telephone and secondary telephone if the service node is operational, and the service control point forwards the incoming call to the service node for generating a first outgoing call to the primary telephone and a second outgoing call to the secondary telephone if, but only if, both the primary telephone and the secondary telephone are idle.

20. The telecommunication system of claim 19, wherein the detecting means is performed by a trigger provisioned at the first service switching point.

21. The telecommunication system of claim 20, wherein the trigger is a termination attempt trigger.

22. The telecommunication system of claim 19, wherein the secondary telephone is a wireline telephone connected to a second service switching point.

23. The telecommunication system of claim 22, wherein the busy/idle status checking means is performed by the service control point by sending Monitor_for_Change messages to, and by receiving Status_Reported messages from, the first service switching point and the second service switching point.

24. The telecommunication system of claim 19, wherein secondary telephone is a wireless telephone served by a home location register.

25. The telecommunication system of claim 24, wherein the busy/idle status checking means is performed by the service control point by sending a Monitor_for_Change message to, and by receiving Status_Reported message from, the first service switching point, and by sending an IS-41 LocationRequest message to, and by receiving an IS-41 LocationRequest Return Result message from, the home location register.

26. The telecommunication system of claim 19, wherein the second outgoing call is generated about four seconds before the first outgoing call is generated.

27. A telecommunication system comprising a service node, a first telephone, a switch associated with the first telephone, and a second telephone, wherein when the first telephone receives an incoming call from a caller, the switch forwards the incoming call to the service node if the service node has been determined to be operational, the service node then generates a first outgoing call to the first telephone and a second outgoing call to the second telephone if both the first telephone and the second telephone have been determined to be idle, and when one of the first telephone and the second telephone answers, the service node makes a connection between the caller and the telephone that answers, maintains the connection for a predetermined duration, and withdrawing from the connection after the predetermined duration has expired.

28. The telecommunication system of claim 27, wherein the predetermined duration is a tunable variable.

29. A method for providing simultaneous ringing service comprising:
associating a first telephone number of a wireline telephone and a second telephone number of a wireless telephone in a database accessible by a service control point;
detecting an incoming call to the wireline telephone;
determining by the service control point an operational status of a service node associated with the service control point;
checking by the service control point busy/idle status of the wireline telephone and the wireless telephone if the service node is operational;
generating by the service node a first outgoing call to the wireless telephone and a second outgoing call to the wireline telephone if, but only if, both the wireline telephone and the wireless telephone are available to receive calls; and
after one of the wireline telephone and the wireless telephone answers one of the first outgoing call and the second outgoing call, connecting the incoming call to the telephone that has answered and canceling the remaining one of the first outgoing call and the second outgoing call.

30. The method of claim 29, wherein the detecting is performed by a trigger provisioned at a service switching point connected to the wireline telephone.

31. The method of claim 30, wherein the trigger is a termination attempt trigger.

32. The method of claim 29, wherein the checking is performed by the service control point by sending a Monitor_for_Change message to, and by receiving Status_Reported message from, the service switching point, and by sending an IS-41 LocationRequest message to, and by receiving an IS-41 LocationRequest Return Result message from, a home location register serving the wireless telephone.

33. The method of claim 29, wherein the second outgoing call is generated about four seconds after the first outgoing call is generated.

34. The method of claim 29, further comprising:
  keeping the incoming call connected through the service node for a predetermined duration; and
  upon expiration of the predetermined duration, withdrawing the service node from the incoming call connection.

35. The method of claim 34, wherein the predetermined duration is a tunable variable.

36. A method for making simultaneous ringing calls comprising:
  detecting by a switch an incoming call from a caller telephone to a primary telephone of a subscriber;
  querying a service control point by the switch for a secondary telephone associated with the subscriber;
  determining by the service control point an operational status of a service node associated with the service control point;
  checking by the service control point busy/idle status of the primary telephone and the secondary telephone if the service node is operational; and
  generating by the service node a first ongoing call to the primary telephone and a second outgoing call to the secondary telephone if, but only if, both the primary telephone and the secondary telephone are idle.

37. The method of claim 36, wherein the determining includes exchanging messages between the service control point and the service node.

38. The method of claim 37, wherein the messages are exchanged via X.25 interface.

39. The method of claim 36, further comprising:
  connecting the caller telephone to one of the primary telephone and the secondary telephone that answers one of the first outgoing call and the second outgoing call;
  canceling the remaining one of the first outgoing call and the second outgoing call;
  keeping the caller telephone and the one of the primary telephone and the secondary telephone connected through the service node for a predetermined duration; and
  upon expiration of the predetermined duration, withdrawing the service node from the connection.

40. The method of claim 39, wherein the predetermined duration is a tunable variable.

* * * * *